(12) United States Patent
Laing et al.

(10) Patent No.: US 7,372,032 B1
(45) Date of Patent: May 13, 2008

(54) RADIATION DETECTION BADGE AND METHOD OF MAKING SAME

(75) Inventors: Barrie Laing, Morgan Hill, CA (US); Robert A. Harvey, Los Altos, CA (US)

(73) Assignee: Radiation Detection Company, Gilroy, CA (US)

( * ) Notice: Subject to any disclaimer, the term of this patent is extended or adjusted under 35 U.S.C. 154(b) by 0 days.

(21) Appl. No.: 11/391,083

(22) Filed: Mar. 27, 2006

Related U.S. Application Data (63) Continuation-in-part of application No. 10/340,032, filed on Jan. 8, 2003, now Pat. No. 7,026,616.

(60) Provisional application No. 60/430,480, filed on Dec. 2, 2002.

(51) Int. Cl.
*G01T 1/11* (2006.01)
(52) U.S. Cl. .................................... 250/337
(58) Field of Classification Search ............... 250/337
See application file for complete search history.

(56) References Cited

U.S. PATENT DOCUMENTS

| | | | |
|---|---|---|---|
| 3,786,254 A | 1/1974 | Yamashita et al. | 250/71 R |
| 4,286,165 A * | 8/1981 | Jones et al. | 250/484.3 |
| 4,825,084 A | 4/1989 | Braunlich et al. | 250/484.1 |
| 4,975,589 A | 12/1990 | Chamberlain et al. | 250/484.1 |
| 5,049,754 A | 9/1991 | Hoelscher et al. | 250/484.1 |
| 5,179,281 A * | 1/1993 | Tawil et al. | 250/337 |
| 7,026,616 B1 | 4/2006 | Laing et al. | 250/337 |

FOREIGN PATENT DOCUMENTS

FR   2 648 239   12/1990

OTHER PUBLICATIONS

"Mechanisms Used for Detecting Radiation", The Department of PET and Nuclear Medicine, http://www.cs.nsw.gov.au/rpa/pet/RadTraining/MechanismforRadDet.htm, Nov. 26, 2002, pp. 1 of 3.
"Thermoluminescence", http://www.triumf.ca/safety/rpt_6/node30.html, Nov. 26, 2002, pp. 1 of 1.
"3. Dosimetry", http://ee.tut.fi/rgi/kurssit/71221/DOSIMETRIA/dosi01.html, Nov. 26, 2002, pp. 1 of 9.
"Thermo MeasureTech History", http://thermo.com/eThermo/CDA/About_Us/About_Us_Home/0,1177,137,00.html, Nov. 15, 2002, pp. 1 of 2.
"InLight Systems Dosimeters", 2005 http://ldrsolutions.landauerinc.com/PRODUCTCATALOG/content/documents/45_InLightDosimeter.en-US.pdf.

\* cited by examiner

*Primary Examiner*—Constantine Hannaher
(74) *Attorney, Agent, or Firm*—Haverstock & Owens LLP (57) ABSTRACT

A radiation detection device, system and method is disclosed. A radiation detection badge in accordance with the invention comprises a radiation detection unit placed within a sealed thermoplastic package, wherein the thermoplastic package has a geometric feature that constrains the radiation detection unit to an orientation within the package. A radiation detection badge according to the present invention includes radiation detection units in a plurality of cup structures, sealed them with a plurality of corresponding lid structures. Further, a method of tracking radiation exposure of one or more batches of users is provided.

25 Claims, 5 Drawing Sheets

RADIATION DETECTION BADGE AND METHOD OF MAKING SAME

RELATED APPLICATIONS

This application is a Continuation-in-part Application of the U.S. patent application Ser. No. 10/340,032 filed Jan. 8, 2003 now U.S. Pat. No. 7,026,616 and titled "RADIATION DETECTION DEVICE, METHOD AND SYSTEM", which claims priority under 35 U.S.C. § 119(e) of the co-pending U.S. Provisional Patent Application, Ser. No. 60/430,480 filed Dec. 2, 2002, and entitled "RADIATION DETECTION DEVICE, METHOD AND SYSTEM". The U.S. patent application Ser. No. 10/340,032 filed Jan. 8, 2003 and titled "RADIATION DETECTION DEVICE, METHOD AND SYSTEM" and the Provisional Patent Application, Ser. No. 60/430,480 filed Dec. 2, 2002, and entitled "RADIATION DETECTION DEVICE, METHOD AND SYSTEM" are both hereby incorporated by reference.

FIELD OF THE INVENTION

This invention relates generally to radiation detection. More specifically, the invention relates to radiation detection devices, methods and systems using thermoluminescent dosimetry and to methods and systems for production of these types of devices.

BACKGROUND OF THE INVENTION

Dosimetry generally refers to the measurement of a long term absorbed radiation dose, rather than some momentary radiation quantity or rate. A dosimetry device counts the total radiation dose over some time interval. Detection of the radiation is based on the interaction between the radiation and some material. This interaction can cause physical, chemical or biological changes depending on the nature of the material and the amount of the radiation energy absorbed into the material.

There are a number of different dosimetry methods currently used. For example, calorimetry is based on the ability of radiation to heat water, chemical dosimetry is based on the ionization ability of radiation in water, film dosimetry utilizes the darkening of a film caused by ionizing radiation and thermoluminescent dosimetry (TLD) utilizes thermally addressable energy generated by the radiation which is trapped or stored within a thermoluminescent material.

When a thermoluminescent material is irradiated, part of the absorbed energy is preserved in meta-stable energy levels of electron bands. The preserved energy may later be released by heating the material. Part of the released energy can be detected as visible light, and the amount of light that is detected can be correlated to a dose of radiation exposure.

Thermoluminescence is most commonly observed in crystalline materials which provide energy levels, or bands within an inorganic crystal lattice, where electrons and holes can be stored in one or more meta-stable states. For example, when an electron in a valence band receives enough energy it may advance to the conduction band. At the same time, a hole is formed to the valence band. In general these states are not stable. However, meta-stable energy levels or traps are formed between the conduction and valence band by adding some chemical impurities or by causing defects in the lattice structure, allowing meta-stable electrons and holes to remain trapped. When a thermoluminescent material is heated, the trapped electrons and holes are released and recombine resulting in the emission of detectable light which is then used to determine the dose of the radiation exposure.

A particularly sensitive thermoluminescent material is lithium-fluoride, which is doped with magnesium and titanium (LiF:Mg,Ti dosimeter). Thermoluminescent dosimetry can be used in a number of radiation measuring and monitoring applications including, personnel radiation monitoring, environmental radiation monitoring, radio-therapy monitoring and in scientific research, including geology. Therefore, there is a continued need to develop new devices, methods and systems for accurately and efficiently monitoring and measuring radiation using thermoluminescent dosimetry and thermoluminescent techniques.

Furthermore, several important issues arise when providing a dosimetry service to consumers. Among these are the problems of administrating and maintaining the integrity of a continuous record documenting a consumer's exposure over the life of their relationship with the service provider. Such services typically operate by providing a dosimeter to a customer for a fixed, relatively short period of time, replacing that dosimeter with another, reading the old dosimeter and updating their records. Hence, the problems of keeping accurate records while maintaining efficient throughput of devices become much more significant as the number of clients served increases.

In addition, current devices for monitoring and measuring radiation using thermoluminescent dosimetry suffer from inefficiencies or inadequacies in manufacture. Many current devices are made of overly costly materials, and oftentimes these costly materials are heavier or bulkier than is necessary for a radiation badge. Despite the use of overpriced materials, the construction of current badges is often flawed with many badges suffering from insufficient water resistance and vulnerability to tampering. A more serious problem is the prevalence of designs that do not easily allow recycling of the expensive, and often reusable, sensors that account for the majority of the costs of producing a badge.

SUMMARY OF THE DISCLOSURE

The present invention is directed to devices for radiation detection and to methods and systems for packaging such devices, to create what are commonly known as radiation detection badges. In accordance with the embodiments of the present invention, a radiation detecting device comprises a radiation detection unit placed within a sealed thermoplastic package, wherein the thermoplastic package has a geometric feature that constrains the radiation detection unit to an orientation within the package.

This geometric feature aids in assembly and aligns the units so that a beta window of the package is lined up with a thermoluminescent detector of each of the radiation detection units, which allows permeation of radiation for incidence upon the radiation detection units. The beta window typically comprises Mylar™ or some similar material engineered to mimic the beta-radiation absorbing characteristics of human skin. This material produces less attenuation of beta rays than does the thermoplastic material that comprises the balance of the package.

The package comprises cup structures and lid structures. The radiation detection units are placed in the cup structures and the cup structures are sealed around their edges to the lid structures. In addition, in one embodiment of the present invention the cup structures each include a beta window, and a geometric feature which constrains the radiation detection unit so that a thermoluminescent detector therein is aligned with a beta window. More specifically, the geometric feature that constrains the radiation detection units includes at least one of a notch or groove that fits to a matched groove or notch on a portion of each radiation detection unit.

In accordance with further embodiments of the present invention a radiation detection badge includes filter units for enhancing selective detection of various types of radiation. In one embodiment of the present invention, at least one of these filter units includes a radiation detection badge with an aperture through which all types of radiation may freely pass, but the filter itself comprises a radiation-attenuating material. In this embodiment, the aperture is aligned with a thermoluminescent sensor of the radiation detection unit and further aligned with a beta window of the packaging structure that contains the radiation detection unit. Another feature described in the present invention is the placement of a solid filter along a side of the radiation detection unit. When a radiation detection badge is worn by a user, radiation incident on the body of the user can be reflected, or absorbed and reemitted, by the body of the user. Thus, it is advantageous to limit the sensitivity of the detection badge to restrict the radiation measure to that which is incident on the wearer of the badge.

Each radiation detection unit further comprises one or more labels viewable through the package, according to the present invention. In an embodiment of the present invention, a radiation detection unit includes labels viewable through the cup structure and/or the lid structure. These labels comprise an identification means to identify the device with a user. The identification means is any type of unique indicator, but preferably is a bar code that is attached to, or printed on, the label and includes human or machine readable symbols or markings that are a known identifier of the badge, and of its wearer. Further, the label can include an aperture that is aligned with an aperture of the filter unit by interaction of the radiation detection unit and the label with the geometric feature of the package.

In accordance with the method of the present invention, radiation detection units are packaged to create radiation detection badges such as described above. The method includes placing the radiation detection units in a thermoplastic packaging structure and sealing the packaging structure to enclose the radiation detection units. Further, the packaging structure has geometric features that constrain the radiation detection units to an orientation within the packaging structure.

In a further feature, the method of the present invention includes providing cup structures arranged in a monolithic tray prior to sealing the packaging structure. In this embodiment, the step of sealing the packaging structure to form individual radiation detection badges is followed by a step of separating the badges from one another and from the remaining packaging structure. In this way, the present invention provides for the substantially simultaneous assembly of multiple badges.

In another embodiment, the present invention provides a method of making radiation detection badges. The method includes the steps of providing a thermoplastic packaging tray having a plurality of cup structures, providing a thermoplastic packaging lid having a plurality of lid structures, placing radiation sensor units in the plurality of cup structures, and sealing each of the plurality of cup structures with a corresponding one of the plurality of lid structures to seal the radiation sensors therein and form the radiation detection badge. Further, each cup structure has geometric features that constrain the radiation detection units to an orientation within the packaging structure.

Preferably, this embodiment also comprises a step of separating a radiation detection badge from the remainder of the packaging structure after sealing the cup structures. Hence, this embodiment of the present invention provides for the substantially simultaneous assembly of multiple badges, each badge having a structure according to the present invention.

In another aspect, the present invention provides a method of and a system for tracking radiation exposure of one or more batches of users. The method includes an initial step of correlating each user with at least one unique identifier within a database system and creating records describing exposure of each user to radiation. Next, a plurality of physical labels are produced, each correlating with a single one of the unique identifiers and thus with a single user, wherein the labels are readable by machine, human or other means; each of the labels is coupled with one of a set of radiation detection units. Then, each of the set of radiation detection units and the labels are sealed in a thermoplastic structure, wherein the packaging structure has a geometric feature that constrains each of the radiation detection units to a single orientation within the packaging structure, as described in the other embodiments of the present invention. The method further comprises separating the packaged detection units from one another to create a set of radiation detection devices, and then distributing the set of radiation detection devices for use by users during a first predetermined wear period.

In a further aspect, this method of tracking radiation exposure of one or more batches of users includes the additional steps of collecting the set of radiation detection devices from the users, scanning the labels of each of the radiation detection devices and thereby correlating each device with a unique user, scanning each radiation detection unit to obtain a record of the radiation exposure suffered by the unique user thereof during the first wear period, and updating the record describing the exposure of the unique user within the database system.

DETAILED DESCRIPTION OF THE EMBODIMENTS

Figure 1:
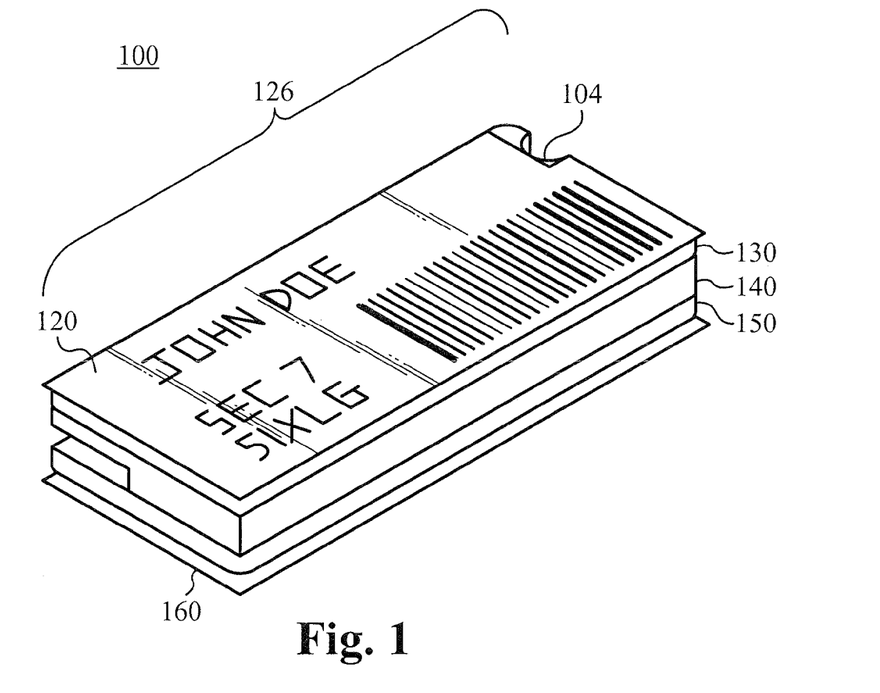
FIG. 1 illustrates a radiation detection unit according to the embodiments of the present invention.

FIG. 1 illustrates a radiation detection unit 100 according to the present invention. The radiation detection unit 100 comprises multiple labels 120 and 160, each comprising an identification means 126, the identification means is any type of unique indicator, but in this embodiment it is a bar code that is printed on the label and describes in human or machine readable language a known identifier of the badge, and of its wearer. The radiation detection unit 100 further comprises filter units 130 and 150 for enhancing selective detection of various types of radiation, and a main detector body 140. Further, the radiation detection unit 100 forms a geometric feature 104 designed for interface with a packaging structure that will now be discussed.

Figure 2:
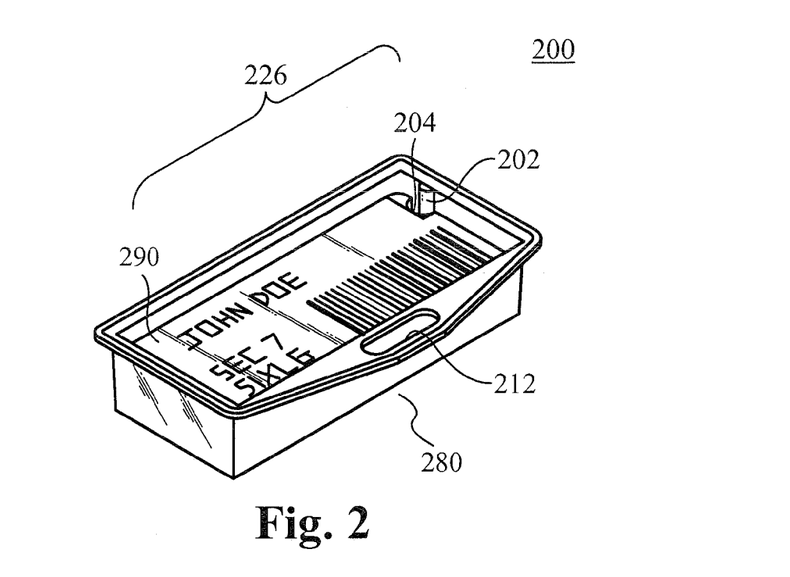
FIG. 2 illustrates a perspective view of an assembled radiation detection badge.

Referring now to FIG. 2, the construction of a radiation badge 200 by packaging a radiation detection unit 290 will now be discussed. While a single badge is shown, it is understood that the embodiments of the present invention describe methods and systems wherein multiple badges may be produced, each having similar structure as described herein. The radiation badge 200 comprises the radiation detection unit 290 enclosed within a packaging structure 280 comprising a lid structure and a cup structure. The lid structure and the cup structure are preferably sealed together by RF welding. The radiation detection unit 290, comprising the identification means 226, forms a geometric feature 204 designed for interface with a geometric feature 202 of the packaging structure 280. Further, the packaging structure 280 forms an aperture 212 to facilitate attachment of the badge 200 to a user (not shown).

Figure 3A:
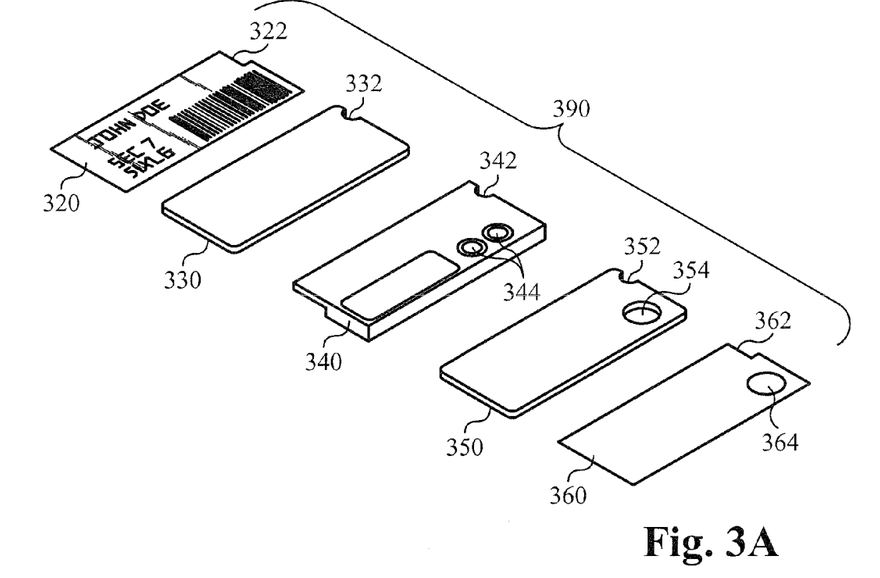
FIGS. 3A-3B illustrate an exploded view of a radiation detection badge including a thermoplastic package and a radiation detection unit according to the embodiments of the present invention.
Figure 3B:
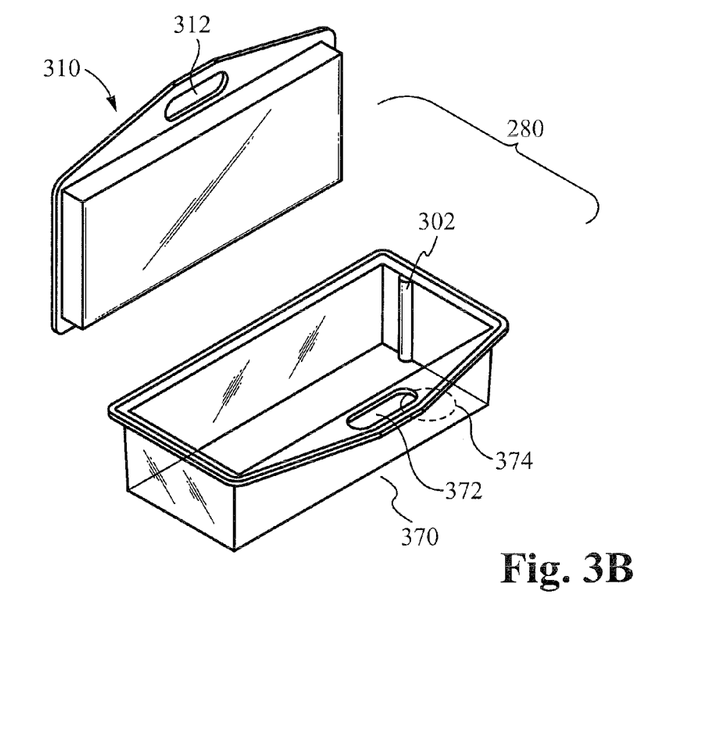

Referring now to FIGS. 3A and 3B, the method of making a radiation badge, similar to the radiation badge 200 in the embodiment illustrated in FIG. 2, shall be discussed. In accordance with the present invention, a cup structure 370 is provided having a geometric feature 302 and a beta window 374, and forming an aperture 372. The present invention provides a radiation detection unit 390 comprising a back label 320, a back filter 330, a main detector body 340, a front filter 350 and a front label 360. When assembled, the radiation detection unit forms a geometric feature for interface with the geometric feature 302 of the cup structure 370.

The assembly of the radiation detection unit 390 is aided by the cup structure 370. More specifically, the geometric feature 302 of the cup structure 370 interacts with geometric features on each component of the radiation detection unit 390 to aid in proper assembly thereof. In the method of the present invention, each component of the radiation detection unit 390 is placed sequentially in the cup structure 380. The front label 360 is placed in the cup structure 370, the geometric feature 362 of the label 360 interacts with the geometric feature 302 to align an aperture 364 formed in the label 360 with the beta window 374 of the cup structure 370. Then, the front filter 350 is placed in the cup structure 370 and on the front label 360, the geometric feature 352 of the front filter 350 interacts with the geometric feature 302 to align an aperture 354 formed in the filter 350 with the beta window 374 of the cup structure 370. After that, the detector body 340 is placed in the cup structure 370 and on the front filter 350, the geometric feature 342 of the detector body 340 interacts with the geometric feature 302 to align a thermoluminescent detector 344 of the detector body 340 with the beta window 374 of the cup structure 370. Then, the back filter 330 is placed in the cup structure 370 and on the detector body 340, the geometric feature 332 of the back filter 330 interacts with the geometric feature 302 to align the back filter 330 with the rest of the detector unit 390. To complete the assembly of the detector unit 390, the back label 320 is placed in the cup structure 370 and on the back filter 330, the geometric feature 322 of the back label 320 interacts with the geometric feature 302 to align the back label 320 with the rest of the detector unit 390.

The lid structure 310 is coupled with the cup structure 370 containing the assembled radiation detection unit 390. The aperture 312 of the lid structure 310 aligns with the aperture 372 of the cup structure 370. Now the edges of the cup structure 370 are sealed to the edges of the lid structure 310 to create a radiation detection badge 300. It should be noted that in preferred embodiments of the present invention, not only does the geometric feature 302 of the cup structure 370 participate in alignment of the radiation detection unit 390, but the overall geometry of the space within the packaging structure 380 also is designed to tightly contain the assembled radiation detection unit 390. This works to ensure the continuous alignment of the thermoluminescent detector 344, the apertures 354, 364 and the beta window 374 throughout the wear-cycle of the radiation detection badge 300. It should further be appreciated that this alignment within the packaging, combined with a suitable packaging material, will configure the identification means 324 of the labels 320, 360 to be viewable through the structures 310, 370, respectively.

Figure 4A:
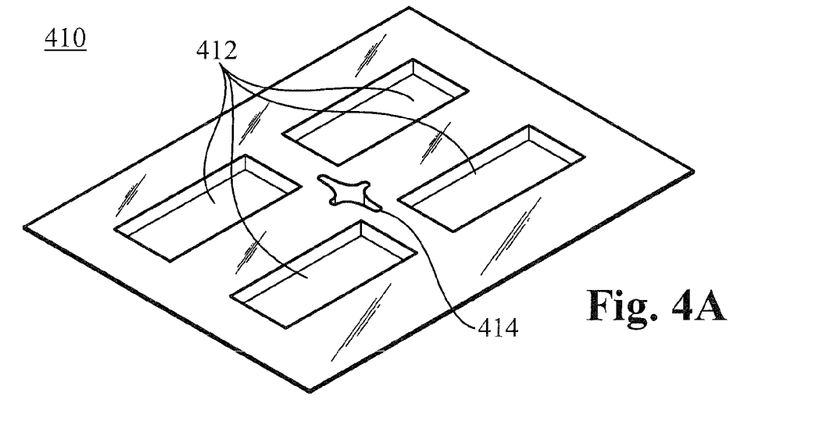
FIGS. 4A-4C illustrate a packaging structure comprising a cup structure (FIG. 4B) and a corresponding lid structure (FIG. 4A); radiation detection units are placed in the cups of the cup structure and the cup structure and lid structure are coupled with one another (FIG. 4C), creating a plurality of radiation detection badges.
Figure 4B:
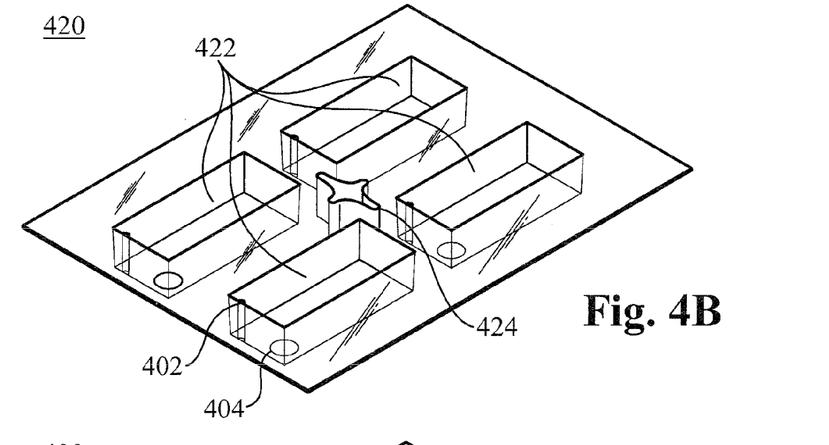
Figure 4C:
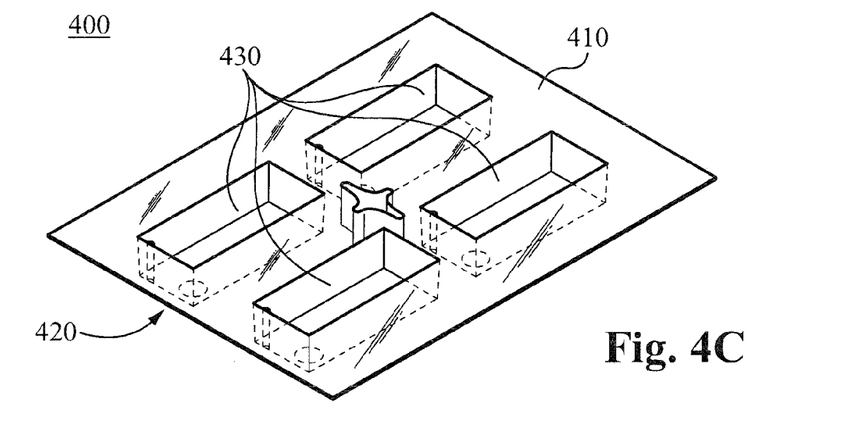

Referring now to FIGS. 4A-4C, a method of and structure for producing multiple radiation badges in a substantially parallel manner is described according to the present invention. A cup structure 420 having a plurality of cups 422 and a geometric feature 424 for alignment is provided. A lid structure 410 having a plurality of lids 412 and a geometric feature 414 is arranged for alignment with the cup structure 420. The cups 422 of the cup structure 420 comprise geometric features 402 and beta windows 404. According to the method of the present invention, a plurality of radiation detection units as described previously are assembled within each of the cups 422 in a manner substantially similar to that described in the above discussion of FIGS. 3A and 3B. When the radiation detection units are in the cups 422, the structures 410 and 420 are coupled together. The geometric features 424 and 414 align with each other to ensure proper orientation of the cups 412 with the lids 422. The structures 410 and 420 are initially pressed together by a friction fit to create a plurality of enclosed packages 430 within a monolithic packaging structure 400. As in previously described embodiments, the geometric features 402 act along with the constrained geometry within the packages to restrict movement of the radiation detection units within the cups, ensuring a continuous and known alignment of the radiation detection units within the packages 430. After the press fit is properly achieved, the edges of the cups 420 are sealed with the edges of the lips 410, sealing the packages 430, preferably with RF welding. Following the sealing, the now-sealed packages 430 are die-cut from within the packaging structure 400 and removed from the remaining packaging. Following removal, each package 430 is a radiation detection badge according to the method of the present invention.

Figure 5:
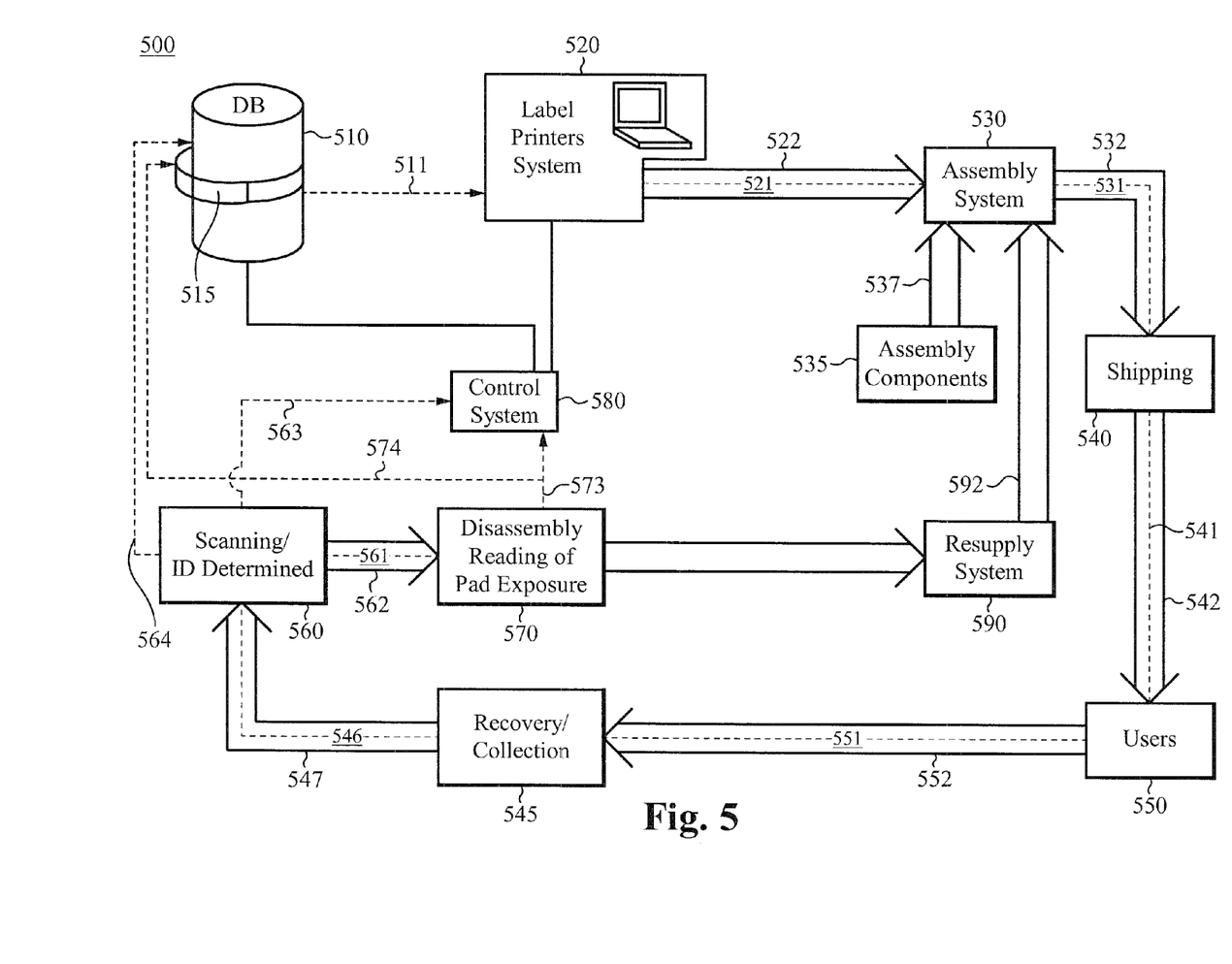
FIG. 5 illustrates a radiation exposure tracking system comprising a radiation badge production system.

In another aspect, the present invention provides a method of and a system for tracking radiation exposure of one or more batches of users. Reference will now be made to FIG. 5, which illustrates the system 500 according to this aspect of the present invention. The system 500 comprises a central control means 580 exercising control over a database 510 and a label printing system 520. Within the database unique identifiers 515 corresponding to users of the radiation detection system are correlated with records describing the radiation exposure of those users. These unique identifiers 515 or other, substantially unique codes correlated thereto are used throughout the system. For simplicity, reference will only be made to the unique identifiers 515 though this will be understood to encompass equivalents thereof. The control means 580 is configured to permit passage of a unique identifier 515 to the label printer system 520, as illustrated by the dashed line 511, where the identifier 515 is used to create labels correlated with the unique identifiers 515. The correlated labels and the unique identifiers 515 are then transmitted to an assembly system 530, as illustrated by the solid arrow 522 and the dashed line 521, respectively. Throughout FIG. 5, the dashed lines are understood to correspond with transmission of the unique identifiers 515 and the solid arrows are understood to correspond with transmission of physical components not illustrated herein. The assembly system also receives additional assembly components from the supply source 535 as illustrated by the arrow 537, and from the resupply system as is discussed below. The labels are used in the assembly of multiple radiation badges in a substantially parallel manner, as discussed in the description of embodiments above.

In the method of the present invention, after the badges are assembled, the labels are coupled with the badges, hence the unique identifiers 515 are coupled with the badges. As illustrated by the arrow 531, 532 the badges are staged in a shipping system 540; the arrows 541, 542 illustrate transmission of the badges to the users 550. The badges remain with the users for a wear cycle, during which they are exposed to radiation. At the conclusion of the wear cycle, the badges are recovered by a collection system 545 as indicated by the arrow 551, 552, and sent to a scanning system 560, as indicated by the arrow 546, 547. The scanning system 560 sends the unique identifier 515 to the control system 580 as indicated by the dashed line 563. Following scanning, the badges are sent to the disassembly system 570 wherein the radiation exposure measured by the badge is determined and correlated by the control system 580 with the unique identifier 515. Ultimately, the exposure measured in the disassembly system is used to update a record corresponding to the unique identifier 515 within the database 510. The appropriate information moves from the scanning system 560 and the disassembly system 570 to the database 510 as indicated by the dashed lines 564, 573, 574. Following determination of radiation exposure, reusable parts of the badge move to the resupply system 590 as indicated by the arrow 572 where they are conditioned to be moved to the assembly system 530 as indicated by the arrow 592.

Figure 6:
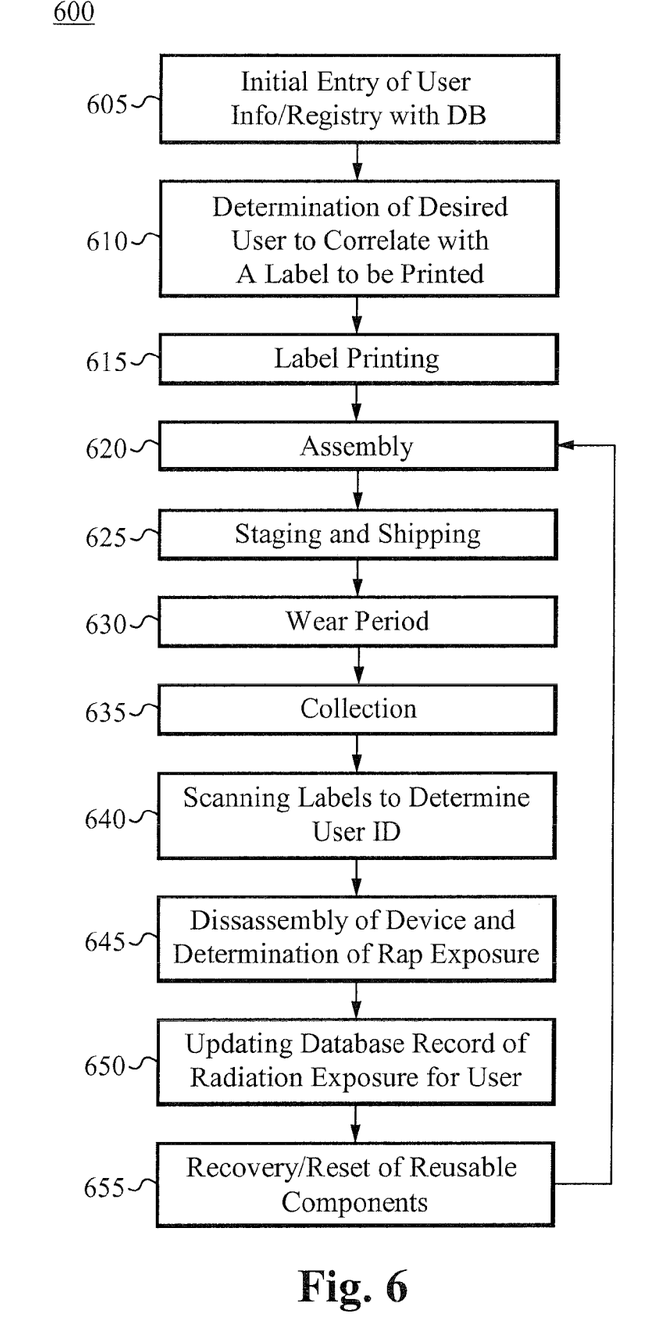
FIG. 6 illustrates a method of tracking radiation exposure of one or more batches of users.

Reference will now be made to FIG. 6, which illustrates the method of tracking radiation exposure of one or more batches of users using the system described in the preceding paragraphs. The method according to the embodiments of the present invention comprises an initial step 605 of correlating each user with at least one unique identifier within a database system and generating records describing exposure of each user to radiation. Then a determination is made in step 610 as to which users to print labels for, and a plurality of physical labels are produced in step 615, each correlating with a single one of the unique identifiers and thus with a single user, wherein the labels are readable by machine, human or other means. In the assembly step 620 each of the labels is coupled with one of a set of radiation detection units and each of the set of radiation detection units and the labels are sealed in a thermoplastic structure, wherein the packaging structure has a geometric feature that constrains each of the radiation detection units to a single orientation within the packaging structure, as described in the previous aspects of the present invention. The assembly step 620 further comprises separating the packaged detection units from one another to generate a set of radiation detection devices. Then, the devices are staged and shipped in step 625, distributing the set of radiation detection devices for use by users during a first predetermined wear period which is illustrated as step 630. The next step 635 is to collect the set of radiation detection devices from the users, then in 640 to scan the labels of each of the radiation detection devices and thereby correlating each device with a unique user. In step 645 each radiation detection unit is scanned to obtain a record of the radiation exposure suffered by the unique user thereof during the first wear period. Step 650 comprises updating the record describing the exposure of the unique user within the database system. After the needed information has been extracted from the badge, reusable components are reconditioned in step 655 for reuse in the assembly step 620.

A device according to the present invention is capable of providing more reliable dosimetry at a lower cost than present methods. The geometric features of the packaging in the current invention provide an inexpensive, but very replicable packaging state for a radiation detection unit. The certainty in alignment of the thermoluminescent detector of the radiation detection unit with the beta window of the detection unit, and the tight constraints the packaging imposes on movement of the radiation detection unit provide significant assurance as to the operating conditions of the radiation detection unit. Further, the inclusion of filter units within the radiation detection unit provides an additional measure of reliability. Packaging elements of a radiation detection device in a cup and lid packaging construction provides for a low cost and tamper proof method for making radiation detection devices. Further, the method of the present invention wherein multiple devices are assembled in a substantially parallel fashion provides for a manufacturing operation with higher throughput, more efficiency and thus lower costs than prior systems.

An additional advantage is provided by sealing the packaging structure with RF welding instead of thermal means. Most common dosimeter devices use thermoluminescent materials to accomplish storage of radiation exposure information. These materials are both radiologically and thermally active, in many cases their thermally dependent and radiation dependent properties are not entirely independent of each other. In fact, in many commercial dosimeters, thermal treatments are used to reset the device in preparation for a new reading cycle. Because thermal treatments can affect the apparent radiation measurements from a particular device, exposing a device to thermal energy between baseline measurement and radiation exposure measurement can corrupt the measurement.

The present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiment chosen for illustration without departing from the spirit and scope of the invention.

For example, a label comprising an identifying mark or code might be printed on the exterior of the packaging, or otherwise permanently attached thereto instead of being coupled with the radiation detection unit.

What is claimed is:

1. A method of packaging radiation detection units, the method comprising:
 a) providing a thermoplastic packaging structure;
 b) placing the radiation detection units in the packaging structure; and, c) sealing the packaging structure to enclose the radiation detection units, wherein the packaging structure has geometric features that constrain the radiation detection units to an orientation within the packaging structure, further wherein the geometric features include a notch that fits into a matched groove on a portion of each radiation detection unit.

2. The method of claim 1, wherein the packaging structure comprises cup structures and lid structures and where the radiation detection units are placed in the cup structures and the cup structures are sealed around their edges to the lid structures.

3. The method of claim 2, wherein the cup structures each include a beta window.

4. The method of claim 3, wherein each beta window is aligned with a thermoluminescent detector of one of the radiation detection units.

5. The method of claim 4, wherein the radiation detection unit comprises filter units for enhancing selective detection of various types of radiation.

6. The method of claim 2, wherein the cup structures are arranged in a monolithic tray prior to sealing the packaging structure.

7. The method of claim 6, further comprising separating radiation detection units after sealing the packaging structure to form individual radiation detection badges.

8. The method of claim 1, wherein the radiation detection units further comprise one or more labels viewable through the packaging structure.

9. The method of claim 8, wherein the one or more labels are each constrained to an orientation within the packaging structure.

10. A method of making radiation detection badges, the method comprising:
   a) providing a thermoplastic packaging tray having a plurality of cup structures;
   b) providing a thermoplastic packaging lid having a plurality of lid structures;
   c) placing radiation sensor units in the plurality of cup structures; and,
   d) sealing each of the plurality of cup structures with a corresponding one of the plurality of lid structures to seal the radiation sensors therein and form the radiation detection badge,
   wherein each cup structure has geometric features that constrain the radiation
   sensor unit to an orientation within the cup structure, further wherein the geometric features include a notch that fits into a matched groove on a portion of each of the radiation sensor units.

11. The method of claim 10, wherein the cup structures include beta windows.

12. The method of claim 11, wherein the beta windows are aligned with thermoluminescent detectors of the radiation sensor units.

13. The method of claim 12, wherein the radiation detection units comprises filter units for enhancing selective detection of various types of radiation.

14. The method of claim 10, further comprising separating a radiation detection badge after sealing.

15. The method of claim 10, wherein the radiation sensor units further comprises labels viewable through at least one of the cup structure or the lid structure.

16. The method of claim 15, wherein the labels are constrained to an orientation within the cup structures.

17. A radiation detecting device comprising a radiation detection unit placed within a sealed thermoplastic package, wherein the thermoplastic package has a geometric feature that constrains the radiation detection unit to an orientation within the package, wherein the geometric feature includes a notch that fits into a matched groove on a portion of the radiation detection unit.

18. The device of claim 17, wherein the thermoplastic package comprises a cup structure and a lid structure sealed around their edges.

19. The device of claim 18, wherein the cup structure includes a beta window.

20. The device of claim 19, wherein the beta window is aligned with a thermoluminescent detector of the radiation detection unit.

21. The device of claim 20, wherein the radiation detection unit comprises filter units for enhancing selective detection of various types of radiation.

22. The device of claim 17, wherein the radiation detection unit further comprises one or more labels viewable through at least one of the cup structure or lid structure.

23. A method of tracking radiation exposure of one or more batches of users, the method comprising:
   a) correlating each user with at least one unique identifier within a database system and creating records describing exposure of each user to radiation;
   b) producing a plurality of physical labels each correlating with a single one of the unique identifiers and thus with a single user, wherein the labels are readable by machine, human or other means;
   c) coupling one or more of the labels with a set of radiation detection units;
   d) sealing the set of radiation detection units and the labels in a thermoplastic structure, wherein the thermoplastic package has a geometric feature that constrains each of the radiation detection units to a single orientation within the thermoplastic package;
   e) separating the packaged detection units from one another to create a set of radiation detection devices; and,
   f) distributing the set of radiation detection devices for use by users during a first predetermined wear period.

24. The method of claim 23 further comprising:
   a) collecting the set of radiation detection devices from the users;
   b) scanning the labels of each of the radiation detection devices and thereby correlating each device with a unique user;
   c) scanning each radiation detection unit to obtain a record of the radiation exposure suffered by the unique user thereof during the first wear period; and
   d) updating the record describing the exposure of the unique user within the database system.

25. A radiation detecting device comprising:
   a) a sealed thermoplastic package, including a cup structure and a lid structure sealed therewith around an edge of the cup structure; and
   b) a radiation detection unit placed within the sealed thermoplastic package,
   wherein the cup structure has a notch that corresponds to a groove of the radiation detection unit and thereby constrains the radiation detection unit to a single orientation within the package, further wherein the cup structure includes a beta window for transmission of beta radiation and the beta window is aligned with a radiation detector of the radiation detection unit when the radiation detection unit is in the single orientation within the package.

* * * * *